United States Patent
Tamagni

[15] 3,641,737
[45] Feb. 15, 1972

[54] PACKAGING MACHINE FOR BAGS TO BE FILLED WITH LIQUIDS, POWDERS OR GRANULAR PRODUCTS

[72] Inventor: Luigi Tamagni, Milano, Italy
[73] Assignee: EUROSICMA-Societa Italiana Costruzioni Macchine Automatiche S.r.l., Milan, Italy
[22] Filed: Jan. 14, 1970
[21] Appl. No.: 2,858

[30] Foreign Application Priority Data
Jan. 23, 1969 Italy..................................11900 A/69

[52] U.S. Cl................................................53/182, 53/251
[51] Int. Cl. ....................................B65b 9/02, B65b 61/08
[58] Field of Search......................53/28, 180, 182, 159, 160, 53/166, 169, 53, 251

[56] References Cited

UNITED STATES PATENTS

| | | | |
|---|---|---|---|
| 3,139,714 | 7/1964 | Hall | 53/159 |
| 3,237,369 | 3/1966 | Stroop | 53/180 |
| 3,435,584 | 4/1969 | Prechter | 53/159 X |
| 3,445,980 | 5/1969 | Salomon | 53/159 X |

*Primary Examiner*—Theron E. Condon
*Assistant Examiner*—Eugene F. Desmond

[57] ABSTRACT

The improvement resides in the provision of a deflecting roller sucking with suction pads the packages sealed and cut, so as to horizontally deflect the same of 90° and cause the fall thereof in containers constituting a first endless conveyor. A second endless conveyor is provided, the width of which is the same as the package and moved perpendicularly to the first mentioned endless conveyor.

3 Claims, 6 Drawing Figures

PATENTED FEB 15 1972
3,641,737
SHEET 1 OF 2
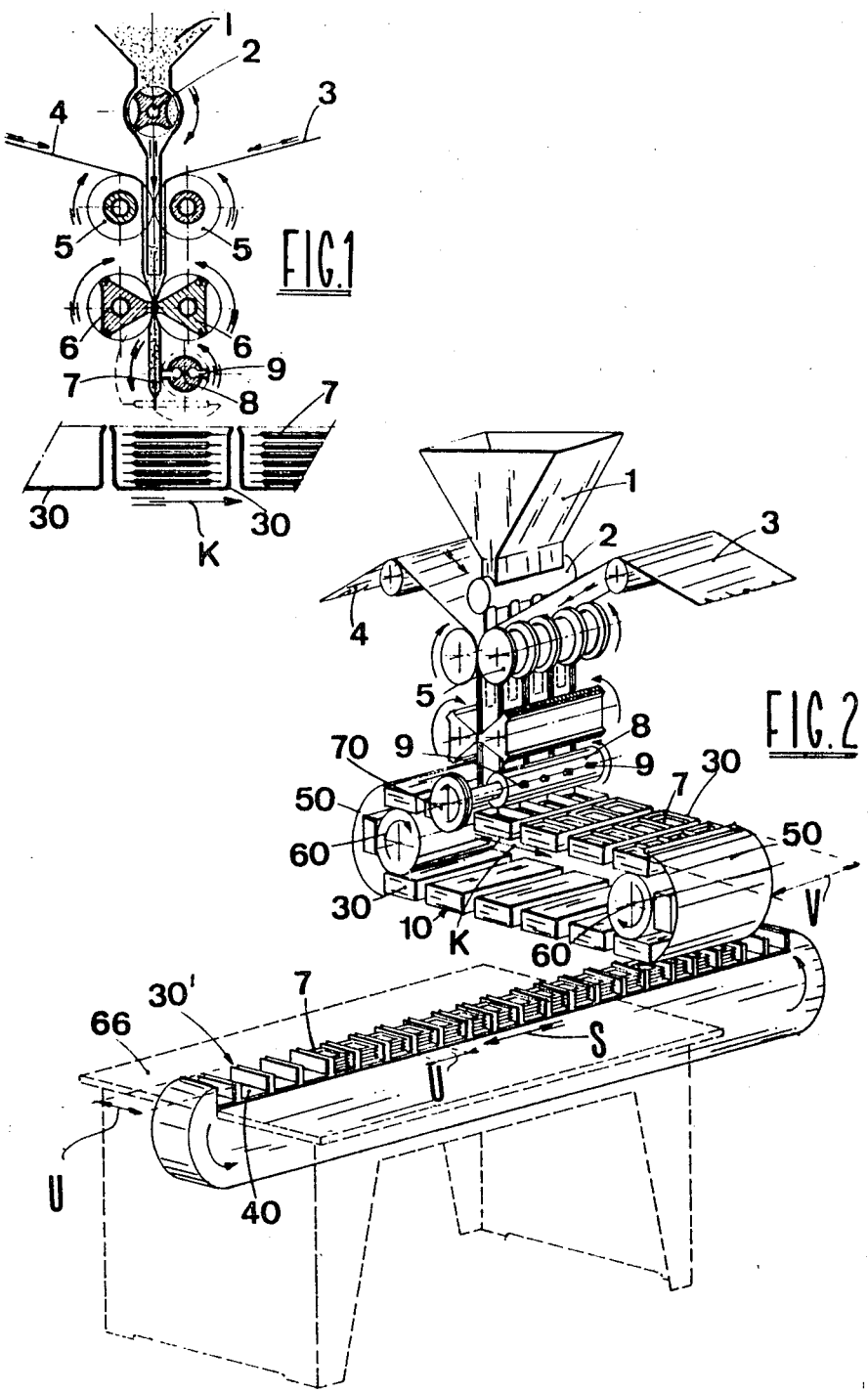
INVENTOR
Luigi Tamughi

PACKAGING MACHINE FOR BAGS TO BE FILLED WITH LIQUIDS, POWDERS OR GRANULAR PRODUCTS

The present invention relates to improvements in packaging machines comprising a first pair of sealing rollers adapted to form longitudinal seals between two webs of thermoplastic film material, a rotating device for the material to be packed, a second pair of rollers acting to form transverse seals and sever the completed packages from the two webs. More particularly the invention is concerned with an improvement by which the packages made by a packaging machine known as above can be oriented, directly cartoned or piled up in order to permit a subsequent cartoning by hand or automatically by cartoners. As is well known, the cartoning of loose packages creates many difficulties concerning counting, orienting, grouping, which disadvantages in practice increase the cost of the finished product as they involve more handwork. An object of this invention is to mitigate or overcome these difficulties. According to the inventive step just before the severing operation the packages, in vertical position, are sucked by a deflecting roller with suction pads which deflect them of 90° discharging them horizontally in a multiple collecting bucket. Of course the packages are discharged in $n$ rows and each row includes for instance $m$ packages. The above said multiple collecting buckets form an endless conveyor with intermittent motion identified by a rest time T equal to the formation of $n$ rows of bags and a displacement time equal to a small fraction $1/K$ of $T/n$ ($n$ is the number of rows in each multiple bucket). According to a further feature of the above device, a second endless conveyor made of simple buckets is foreseen, placed perpendicularly to the first one, the width of which is equal to the length of the packages and with intermittent motion, with a motion time, for each cycle, slightly less than the formation time T of $n$ packages rows, also in the case that the simple buckets of the second conveyor have to receive, at each cycle, the contents of two or more multiple buckets.

The inventive contents of the invention will be better explained by means of the following description intended only as exemplification and definitively not as a limitation, schematically showed in the enclosed drawing, where:

FIG. 1 shows, a schematic vertical section of a packaging machine according to the invention;

FIG. 2 shows a schematic perspective view of a packaging machine according to one embodiment;

Figure 3:
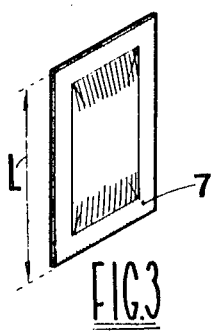
FIG. 3 is a perspective drawing of one package packed on the device of FIG. 1.
Figure 4:
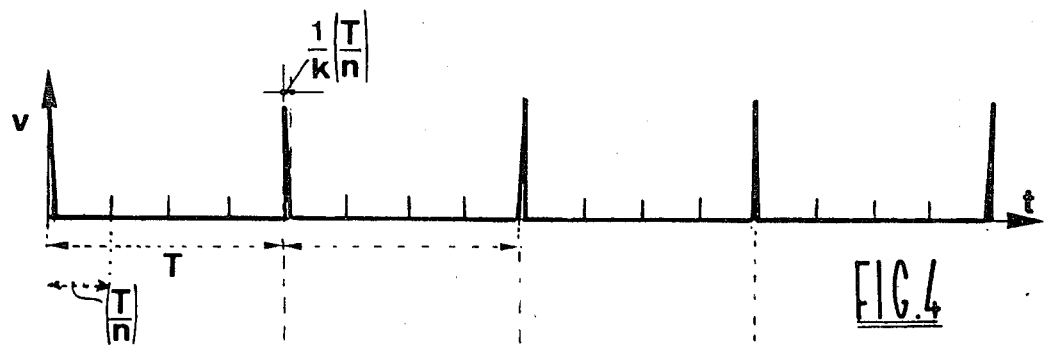
FIG. 4 shows a diagram in function of time $t$, speed $v$ of the intermittent motion of the bucket conveyor receiving the packages from the packaging machine.
Figure 5:
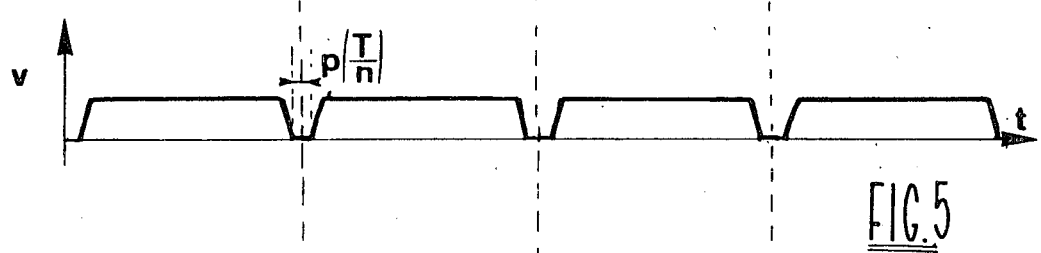

FIG. 5 as per FIG. 4 shows respectively a diagram corresponding to the second belt conveyor in case that the number of the packages received in the simple bucket of the second conveyor is equal to the number of packages of each element of the multiple bucket of the first conveyor, of course, at each cycle.

Figure 6:
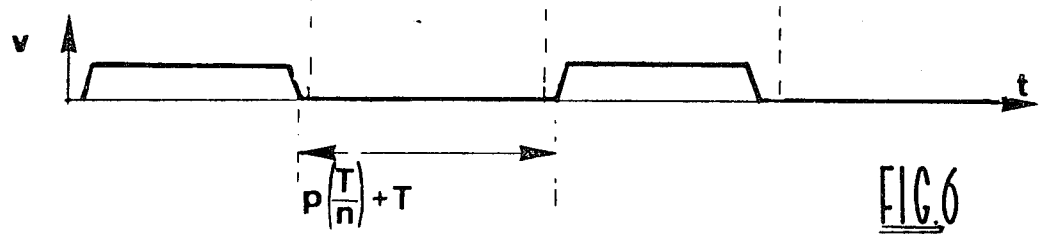

FIG. 6 shows the same as FIG. 5, but in the case that the number of packages received in the simple bucket is the double of the number of packages contained in each element of the multiple bucket of the first conveyor (at each cycle).

With reference now to the drawings in detail, a liquid or powdered or granulated product is discharged from a hopper 1 into a rotatable metering device 2 of a known construction. Two opposed webs 3 and 4 of thermoplastic film are longitudinally heat sealed together by sealing rollers 5 and, at the same time, the product to be packed is dropped into the row of packages being formed. Then a second pair of rollers 6 form cross seals and cut the packages from the webs so as to form a horizontal row of packages.

Just before the row of packages 7 fall down due to gravity, a roller 8 bearing four aligned suction pads 9 connected with a vacuum pump (not shown in the drawings), acts in synchronization with the motion of the machine. The setting of the suction device is arranged such that, immediately before the packages are cut, the suction pads 9 operate to hold the packages while the roller 8 rotates through 90° orienting the packages substantially in the horizontal position; at this moment the suction pads stop acting so that the packages are released and drop into one of a series of composite buckets 30 each formed by $f$ elements (in this case $f=4$). Each multiple (composite) bucket 30 is part of an endless conveyor 10 moved intermittently as shown by arrows K. The conveyor rests for a time T equal to the time required for the production of $n$ (horizontal) rows of packages, after this, each multiple bucket, moves quickly in a time $T/K$ where $K$ is remarkably larger than $n$, i.e., $T/K$ is remarkably shorter than the time $T/n$ required for forming one row of packages. In other words $T/K$ is a small fraction of the time $T/n$ required to form a single row of packages. According to one embodiment of the present invention the endless conveyor 10 carries the composite buckets over a second endless conveyor 40 with a displacement direction S perpendicular to the direction K of the first conveyor 10. This second conveyor 40 has a number of buckets 30' (opened on both ends) having a width U which corresponds to the length $L$ of each package. A guiding cover 50 prevents the packages from falling out of the buckets 30 during the rotation of the conveyor 10 over the guide pulleys 60. The rest time $t$ of the second conveyor 40 is a little lesser than $T/n$ if the number of the multiple buckets 30 received by the buckets 30' at every operative cycle is 1; vice versa if the number of the multiple buckets 30 received by the buckets 30' is 2, 3, 4 then the above rest time $t$ is increased of the time $T/n$, twice the time $T/n$, three times the time $T/n$, etc.... The time of motion is lesser than the time T even in the case when the number of multiple buckets 30' received at every operative cycle is higher than 1.

The conveyor 40 moves slowly for a distance corresponding to the width V of the multiple buckets 30 in a time which is slightly shorter than the time required for the complete filling of one multiple buckets, then stops. The diagram 4 and 5 show very well this, for the case when at every cycle the second conveyor receives the packages contained in one multiple bucket only.

FIG. 6 shows, on the contrary, the diagram of the motion of the second conveyor 40 in the case that this receives at every cycle the contents of two multiple buckets. The upper part of the second conveyor runs on a bench 66 where the operators put the packages into the carton boxes by hand, taking them from the simple bucket 30. The packages can also be handled by an automatic cartoner which can be connected to the second conveyor. If the boxes have top lid, they can be superposed to the buckets 30' or replace them. This represents one of the most interesting feature of the invention.

No reserve is made neither regarding the utilization of temporisers on which depend the different intermittent motions, nor on other devices of technological nature. For example the suction valve 70 on which the suction and release phase of the suction pads 9 depends could vary according to a great variety of solutions.

What I claim is:

1. A packaging machine of the kind consisting of a first pair of sealing rollers able to perform longitudinal seals on two webs of a thermoplastic film, comprising in combination: a rotating metering device for the material to be packed; a pair of sealing-cutting rollers able to complete the finished package from the two webs of thermoplastic material; a first endless conveyor, consisting of a number of multiple buckets; a second endless conveyor consisting of a number of simple U-profiled buckets with two opposite open sides, the said second endless conveyor container being arranged perpendicularly to the first mentioned endless conveyor and having a width equal to the length of a package; a deflecting roller combined with a number of suction pads able to suck the aligned packages just before the cutting operation thereof and discharging them into the said first endless conveyor; first control means for the said first conveyor for giving the same an intermittent motion formed of rest and quick shifting stages; the quick shifting stage time lasting $T/K$, equal to a small fraction $1/K$ of the time T required for obtaining $n$ rows of bags and the rest stage time lasting $T-(T/K)$; second control means for giving the said second endless conveyor and the first conveyor an intermittent motion consisting of a shifting stage and a rest stage; the shifting stage time of the said second endless conveyor lasting less than the time T necessary for filling a multiple bucket regardless of the bag number of the multiple buckets received at every operation cycle.

2. A packaging machine according to the claim 1, where said second endless conveyor is adapted to transport boxes to be filled with the packages.

3. A packaging machine according to the claim 1, comprising in combination for the first mentioned endless conveyor, guiding covers at the locations of the inversion of the motion thereof so as to prevent a fall of the packages discharged into the buckets of the second endless conveyor.

* * * * *